United States Patent
Reincke

(10) Patent No.: US 8,602,120 B2
(45) Date of Patent: Dec. 10, 2013

(54) SOIL WORKING DEVICE

(75) Inventor: Marinus Reincke, Leersum (NL)

(73) Assignee: Redexim Handel-En Exploitalie Maatschappij B.V. (NL)

( * ) Notice: Subject to any disclaimer, the term of this patent is extended or adjusted under 35 U.S.C. 154(b) by 497 days.

(21) Appl. No.: 12/452,635

(22) PCT Filed: Jul. 14, 2008

(86) PCT No.: PCT/EP2008/059191
§ 371 (c)(1),
(2), (4) Date: Apr. 28, 2010

(87) PCT Pub. No.: WO2009/007466
PCT Pub. Date: Jan. 15, 2009

(65) Prior Publication Data
US 2010/0288518 A1 Nov. 18, 2010

(30) Foreign Application Priority Data
Jul. 12, 2007 (EP) .................................. 07112352

(51) Int. Cl.
A01B 45/00 (2006.01)
(52) U.S. Cl.
USPC ............................................ 172/21; 172/24
(58) Field of Classification Search
USPC .......................................... 172/21, 22, 94, 95
See application file for complete search history.

(56) References Cited

U.S. PATENT DOCUMENTS

| 3,797,577 | A | | 3/1974 | Killion et al. | |
|---|---|---|---|---|---|
| 4,422,510 | A | * | 12/1983 | de Ridder | 172/21 |
| 4,632,189 | A | | 12/1986 | Rizzo | |
| 5,207,278 | A | * | 5/1993 | Hatlen | 172/22 |
| 5,797,458 | A | * | 8/1998 | Simon et al. | 172/2 |
| 5,810,092 | A | * | 9/1998 | Selvatici | 172/94 |
| 5,988,290 | A | * | 11/1999 | Banks | 172/21 |
| 6,003,613 | A | * | 12/1999 | Reincke | 172/21 |
| 6,041,869 | A | | 3/2000 | Lewis et al. | |
| 6,199,637 | B1 | * | 3/2001 | Wiedenmann | 172/21 |

(Continued)

FOREIGN PATENT DOCUMENTS

| DE | 4323315 A1 | 1/1995 |
|---|---|---|
| EP | 0037595 A | 10/1981 |

(Continued)

OTHER PUBLICATIONS

Wiedenmann Website, 3 pages, Scotland.

(Continued)

Primary Examiner — Jamie L McGowan
(74) Attorney, Agent, or Firm — Bates and Bates, LLC

(57) ABSTRACT

A mobile soil working device, comprising a machine frame, a drive for at least one piercing tool, a guiding element, moveably guided on the machine frame, for at least one piercing tool, a tool holder for the piercing tool, which holder is mounted around a first pivot axis in the guiding element is provided. It is provided that the overall center of gravity of the tool holder and the at least one piercing tool is arranged in relation to the first pivot axis in such a way that the moment of inertia of the tool holder and the piercing tool that counteracts the restoring moment is at least partially reduced or compensated or overcompensated in such a way that the moment of inertia acting around the first pivot axis forms at least part of the restoring moment.

19 Claims, 9 Drawing Sheets

(56) References Cited

U.S. PATENT DOCUMENTS

| | | | |
|---|---|---|---|
| 7,096,969 B2 * | 8/2006 | Petersen et al. | 172/22 |
| 7,198,114 B2 * | 4/2007 | Simon et al. | 172/22 |
| 7,293,612 B1 * | 11/2007 | Petersen et al. | 172/22 |
| 7,472,759 B2 * | 1/2009 | Petersen | 172/22 |
| 7,669,667 B2 * | 3/2010 | Petersen et al. | 172/22 |
| 7,730,960 B1 * | 6/2010 | Knight et al. | 172/21 |
| 8,051,917 B2 * | 11/2011 | Wiedenmann | 172/21 |
| 2002/0056554 A1 * | 5/2002 | Hargreaves et al. | 172/21 |
| 2005/0178567 A1 * | 8/2005 | Wiedenmann | 172/21 |
| 2009/0166048 A1 * | 7/2009 | Wiedenmann | 172/21 |

FOREIGN PATENT DOCUMENTS

| | | |
|---|---|---|
| EP | 0452449 B1 | 6/1996 |
| EP | 0853869 A | 7/1998 |
| EP | 1108350 A1 | 6/2001 |
| EP | 2014146 B1 | 2/2012 |
| JP | 55-080651 A | 3/1993 |
| WO | WO 89/12381 A1 | 12/1989 |
| WO | WO 02/080651 A1 | 10/2002 |
| WO | WO 03/096784 A1 | 11/2003 |
| WO | WO 2006/102869 | 10/2006 |

OTHER PUBLICATIONS

Wiedenmann Invoice, 4 pages, Mar. 2007, Germany.
Wiedenmann Deep Aerator Part List, Jun. 2011, 22 pages, Scotland.
Wiedenmann Terra Spike Advertisement, 1 page, Germany.
Stefan Kastel, Notice of Opposition, 39 pages, Germany.

* cited by examiner

SOIL WORKING DEVICE

RELATED APPLICATIONS

This application claims priority to PCT Application No. PCT/EP2008/059191 filed Jul. 14, 2008, and EP Application No. 071123525 filed Jul. 12, 2007, the disclosures of which are hereby incorporated by reference.

FIELD

The invention relates to a mobile soil working device for forming cavities in the soil.

BACKGROUND

A known soil working device comprises a machine frame and a drive for at least one piercing tool that can be lifted and lowered, said piercing tool being operable to be pierced into the soil and thereafter to be withdrawn. A guiding element, e.g. a support arm, for at least one piercing tool is moveably guided on the machine frame. Prior to piercing, the piercing tool is arranged in a starting position under a predetermined piercing angle. A tool holder holds one or a plurality of piercing tools. The tool holder is supported around a first pivot axis in said guiding element which can be lifted and lowered by the drive, so that during engagement with the soil, i.e. under application of force, the piercing tool can be pivoted relative to the guiding element. Upon release of the applied force, a device exerts a restoring moment on the tool holder that acts around the first pivot axis, so that the piercing tool after withdrawal from the soil will pivot back again into the starting position.

Devices of the above type serve for forming cavities in the soil with the aid of piercing tools, wherein slit-shaped cavities will be generated in the depth regions of the soil and holes of the smallest possible size will remain on the surface. Said cavities allow for an improved drainage of water and enhance the aeration of the soil, and the loosening of the soil is effective to improve the growth of plants, especially of grasses.

From European Patent Application No. EP-A-0037595, there is known a soil working device comprising two support arms, guided in the manner of a parallelogram, which on one end pivotably carry a tool holder and on the other end are pivotably supported on the machine frame. The pushing rod of the crank drive is articulated to the tool holder and will drive the same, thus causing it to perform an upward and downward movement. One of the two support arms is adjustable in length and includes a restoring spring with a stopper. As long as the piercing tool is outside the soil, the support arm is in abutment on the stopper due the spring force. In the situation where the piercing tool is in the pierced state and the soil working device is being moved on, the piercing tool together with the tool holder will be pivoted opposite to the travel direction, and the length-adjustable support arm will be extended against the spring force.

In the soil working devices known as of yet, spring elements are used which exert a restoring moment on the piercing tools so that the piercing tools, once they are outside the soil, will move back into their starting position again. Hereunder, the starting position is to be understood as that position which said at least one piercing tool assumes briefly prior to piercing. Outside the soil, however, under the effect of the mass inertia and of the upward and downward movement, the moment of inertia of the tool holder and the piercing tool will act against the restoring moment of the spring. For this reason, use is made of spring elements of high spring stiffness in order to move the piercing tools back into their starting position again. The spring elements with high spring stiffness, however, cause an increased risk that the piercing tools, while still within the soil, will cut slits into the soil surface instead of generating the desired small holes.

SUMMARY

The apparatus disclosed advantageously provides that the overall center of gravity of the tool holder and the at least one piercing tool is arranged in relation to the first pivot axis to the effect that the moment of inertia of the tool holder and the piercing tool, counteracting the restoring moment, is at least partially reduced or compensated or overcompensated.

The overall center of gravity of the tool holder and the at least one piercing tool can be arranged in relation to the first pivot axis in such a manner that the moment of inertia of the tool holder and the piercing tool, counteracting the restoring moment, is overcompensated to the effect that the moment of inertia acting around the first pivot axis will form at least a part of the restoring moment.

This embodiment has the advantage that the use of a spring element with lesser spring stiffness is rendered possible or that even no spring element at all is required because the moment of inertia of the tool holder and the piercing tool, counteracting the restoring moment, is at least partially reduced or compensated or overcompensated to the effect that the moment of inertia acting around the first pivot axis will form at least a part of the restoring moment.

A further advantage resides in a reduction of the number of component parts, whereby the production costs are considerably reduced. In addition, the operating life can be increased and the maintenance work can be reduced.

It is a further advantage that, if stoppers are provided for limiting the restoring movement back into the starting position, the impact load acting on the machine frame, on the machine elements and especially on the bearing can be reduced.

The overall center of gravity of the tool holder and the at least one piercing tool can be situated on the first pivot axis.

According to a further exemplary embodiment, it is provided that an additional mass is coupled to the tool holder and is preferably fastened thereto for common rotation therewith.

The overall center of gravity of said additional mass, the tool holder and the at least one piercing tool is arranged in relation to the first pivot axis to the effect that the moment of inertia of the tool holder, said additional mass and the at least one piercing tool, counteracting the restoring moment, is at least partially reduced or compensated or overcompensated.

The overall center of gravity of said additional mass, the tool holder and the at least one piercing tool can be arranged in relation to the first pivot axis in such a manner that the moment of inertia of the tool holder, said additional mass and the at least one piercing tool, counteracting the restoring moment, is overcompensated to the effect that the moment of inertia acting around the first pivot axis will form at least a part of the restoring moment.

The overall center of gravity of said additional mass, the tool holder and the at least one piercing tool can be situated on the first pivot axis.

According to a further exemplary embodiment, it is provided that the distance, preferably the horizontal distance, of the overall center of gravity of the tool holder and the at least one piercing tool, or the distance, preferably the horizontal distance, of the overall center of gravity of said additional mass, the tool holder and the at least one piercing tool from the first pivot axis is adjustable, preferably centrally so for all tool holders.

This has the advantage that, thereby, the amount of the moment of inertia of the tool holder and the at least one piercing tool, or of said additional mass, the tool holder and the at least one piercing tool, will be adjustable.

The guiding element can be a support arm pivotably supported in a second pivot bearing on the machine frame. Said support arm can be configured for length adjustment against a spring force. This has the advantage of achieving an additional reduction of the danger of slit formation. At least one helically or spirally shaped, metallic torsion or pressure spring can generate the spring force counteracting the extending of the support arm. In many embodiments, said spring has a degressive spring characteristic.

At least one torsion and respectively pressure spring element or a spring damper element can be arranged to the side of the support arm in many embodiments parallel to the support arm. Said spring element allows for a pivoting movement of the tool holder around the first pivot axis and, upon release of the engagement with the soil, it will exert at least a part of the restoring moment on the tool holder so that the piercing tool after withdrawal from the soil will be pivoted back into the starting position again.

According to a further exemplary embodiment, it can be provided that said torsion and respectively pressure spring element or said spring damper element is arranged on the machine frame in a manner causing it to exert a high restoring moment on the tool holder if the piercing tool is located outside the soil, and causing it to exert a small restoring moment on the tool holder if the piercing tool is located in the soil.

According to a further exemplary embodiment, it is provided that, between the tool holder and the guiding element, a torsion element is arranged which allows for pivoting movement of the tool holder relative to the guiding element and, upon release of the influence of the force, exerts at least a part of the restoring moment on the tool holder, so that the piercing tool after withdrawal from the soil will be pivoted back into the starting position again. Said torsion element can consist of at least one elastomeric element, an elastomeric compound element or a helically or spirally shaped, metallic torsion spring.

According to a further exemplary embodiment, it is provided that the torsion element comprises at least two magnetic elements, said at least two magnetic elements being oriented relative to each other in a manner causing them to allow for pivoting movement of the tool holder around the first pivot axis and, upon release of the engagement with the soil, to exert at least a part of the restoring moment on the tool holder, so that the piercing tool after withdrawal from the soil will be pivoted back into the starting position again.

Said magnetic elements can consist of permanent magnets or solenoids, the solenoids being adapted to be activated or deactivated in dependence on the movement phase.

Exemplary embodiments of the inventions will be explained in greater detail hereunder with reference to the drawings.

BRIEF DESCRIPTION OF THE DRAWINGS

In the drawings, the following is schematically shown.

DETAILED DESCRIPTION

Figure 1:
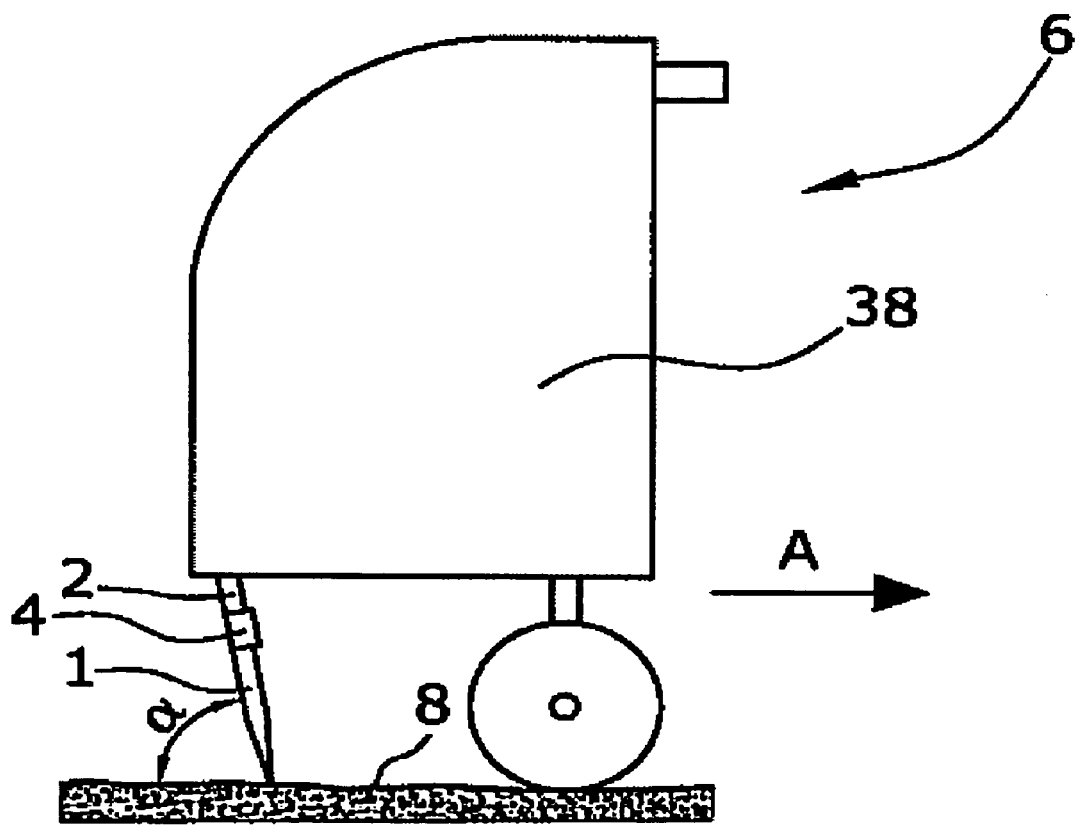
FIG. 1 is a lateral view of a soil working device.

Shown in FIG. 1 is a lateral view of a mobile soil working device which is self-propelled or can be drawn with the aid of a tractor. The soil working device 6 comprises a machine frame 38 whereon, via guiding elements 30, a plurality of piercing tools 1 adapted to be lifted and lowered by a drive 36, are pivotably supported. Due to said lifting and lowering movement, the piercing tools 1 are alternately pressed into the soil 8 and, under the effect of the forward travel of the soil working device 6, perform a tilting movement in the soil 8. Thereby, the soil 8 will be broken up below the piercing hole, whereby e.g. the drainage of the soil 8 is improved. In spite of the travel speed of the soil working device 6, the piercing hole in the surface of the soil shall remain as small as possible.

In many embodiments, said at least one piercing tool 1 is fastened in a tool holder 2 with the aid of a holding means 4. Said tool holder 2, being guided by a guiding element 30, is suited for attachment of piercing tools 1 of various lengths and shapes as well as various diameters. Said guiding element 30 is arranged to perform a lifting and lowering movement while driven preferably by a crank drive 36. By way of alternative, guiding element 30 can also be driven hydraulically or electrically.

Tool holder 2 is supported on guiding element 30 for pivoting around a first pivot axis 12, with tool holder 2 holding therein a piercing tool 1 or a group of piercing tools 1 which under the effect of said lifting and lowering movement can be pierced into the soil 8 and be withdrawn again. It is possible to drive a plurality of preferably mutually adjacent piercing tools 1 or mutually adjacent groups of piercing tools 1. The piercing tools 1 and respectively groups of piercing tools 1 are, in many embodiments, driven with a phase shift.

Figure 2:
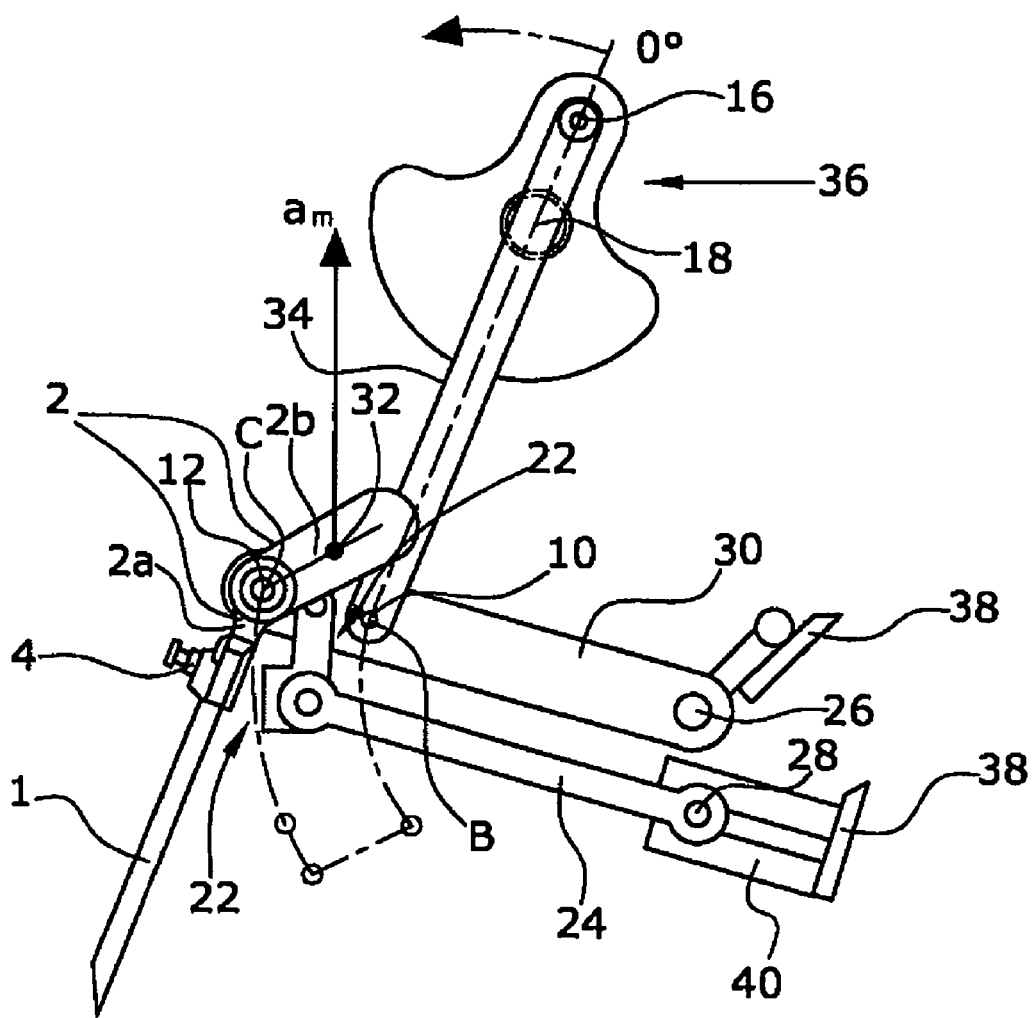
FIG. 2 is a lateral view of an exemplary embodiment of the invention with piercing tool.

FIG. 2 shows a lateral view of an exemplary embodiment of the invention. A crank drive 36 is arranged to drive, via a pushing rod 34, the guiding element 30 which has the form of a support arm. In a first pivot bearing 10, said pushing rod 34 is supported on guiding element 30. In a second pivot bearing 26, guiding element 30 is pivotably supported on machine frame 38. On guiding element 30, a tool holder 2 is supported to be pivoted around a first pivot axis 12. Tool holder 2 comprises two arms 2a, 2b extending in opposite directions from each other. Arm 2a of tool holder 2 comprises a fastening means 4 for fastening at least one piercing tool 1 to tool holder 2 for common rotation therewith.

Arranged parallel to guiding element 30 is a coupling arm 24 which on one end is supported in an adjustment device 40. Adjustment device 40 is fastened to machine frame 38 for common rotation therewith. On the end facing away from adjustment device 40, a stopper 22 is pivotably connected to coupling arm 24. Said stopper 22 in turn is articulated to guiding element 30. The position of stopper 22 can be adjusted with the aid of said adjustment device 40. By way of the position of stopper 22, the starting position of the at least one piercing tool 1 will be adjusted because the at least one piercing tool 1 and/or the tool holder 2 are in abutment on stopper 22 at least prior to piercing. Preferably, adjustment device 40 can be used for centrally setting the starting position for all mutually adjacent piercing tools and respectively groups of piercing tools. Adjustment device 40 can be operated electrically, hydraulically or pneumatically. In the situation where the piercing tool 1 has been pierced and the soil working device 6 is being moved on in the travel direction A, the at least one piercing tool 1 will be pivoted around the first pivot axis 12.

Figure 3:
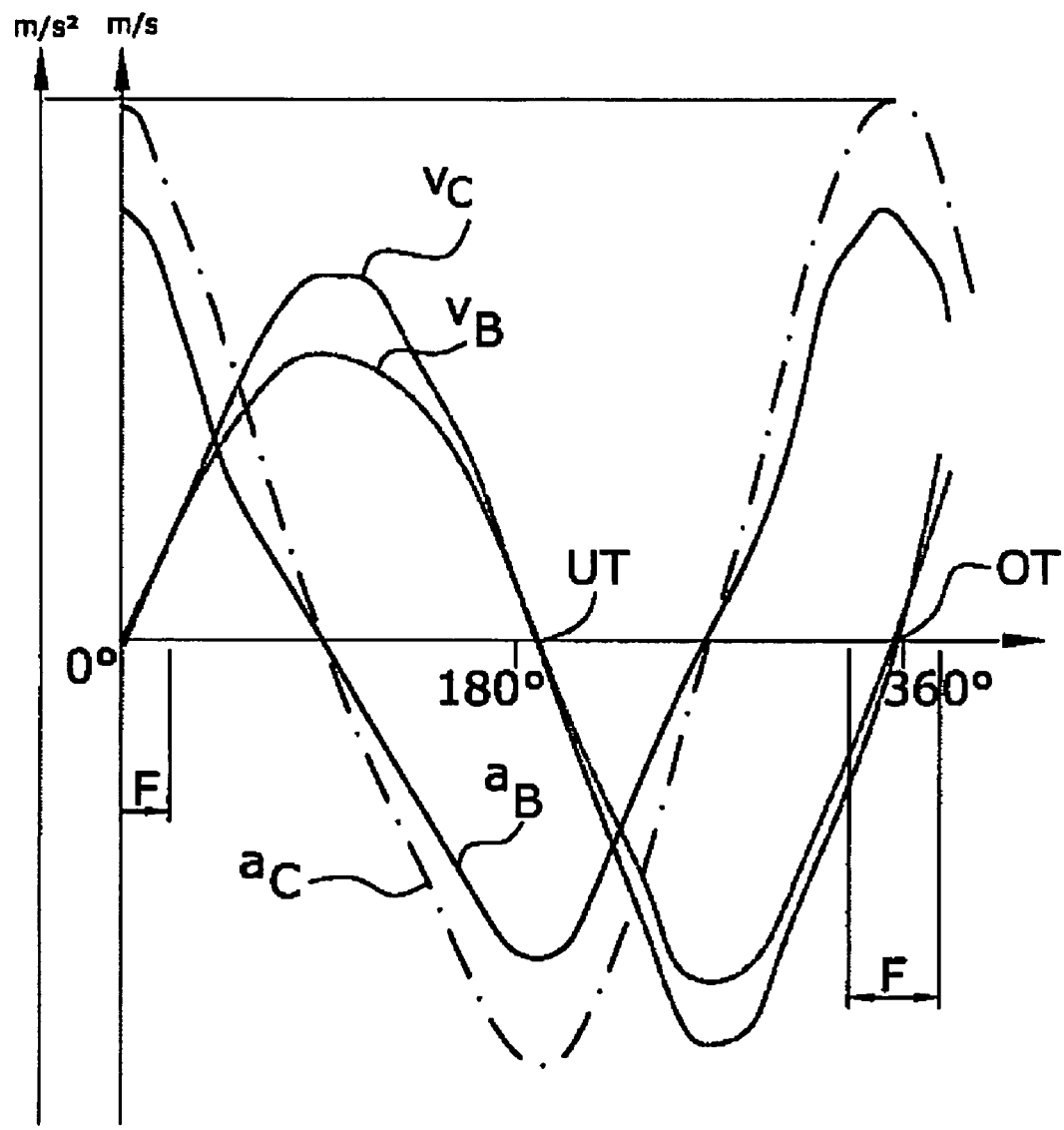
FIG. 3 is a representation of acceleration and speed developments of two points of the support arm.

Said guiding element 30, while driven by the pushing rod 34 of crank drive 36, will perform a lifting and lowering movement particularly at points B and C. In FIG. 3, the speeds $V_B$ and $V_C$ at which the points B and C of guiding element 30 will be lifted and lowered, are represented in a simplified manner for a constant angular speed of crank drive 36.

On the x-axis, the angular orientation of the crankpin 16 is indicated. Said points B and C of guiding element 30 will reach the lower dead center UT when the crankpin has already passed beyond 180°. This is the case since, on the one hand, the rotational axis of crank drive 36 and the first pivot bearing 10 are arranged at a horizontal displacement relative to each other and, on the other hand, the points B and C of guiding element 30—due to the pivoting movement of the guiding element 30 around the second pivot bearing 26—do not perform an exact vertical movement.

In FIG. 3, there are also represented the acceleration developments $a_B$, $a_C$ of the points B and C of guiding element 30. In the upper dead center OT and in the lower dead center UT of the lifting and lowering movement, where the speeds $V_B$, $V_C$ are zero, the accelerations $a_B$, $a_C$ reach their maximum values. The maximum values of the accelerations $a_B$, $a_C$ are by a multiple higher than the earth's acceleration. The piercing tools 1 are located in the region marked by F outside the soil. In this region, the masses which are moved along during the lifting and lowering movement, i.e. also the tool holder 2 and the at least one piercing tool 1, are subjected to a very high acceleration upwards in the vertical direction. If the arm 2b of tool holder 2 of FIG. 2 now has a corresponding weight and is arranged in such a manner relative to the first pivot axis 12 that the overall center of gravity 32 of tool holder 2 and piercing tool 1 in relation to the first pivot axis 12 in the horizontal direction is located on the opposite side of the at least one piercing tool 1, a restoring moment will then be exerted onto tool holder 2 and thus onto the piercing tools 1 so that the piercing tools 1 will be pivoted back into the starting position again.

Alternatively, the exemplary embodiment according to FIG. 2 can be designed to the effect that it is not the tool holder 2 but the at least one piercing tool 1 that comprises two arms. The overall center of gravity of the tool holder 2 and the at least one piercing tool 1 with the two arms is then also arranged in such a manner that the moment of inertia of tool holder 2 and piercing tool 1, acting around the first pivot axis 12, forms at least a part of the restoring moment.

It is also possible to fasten an additional mass 44 to tool holder 2 and/or piercing tool 1 for common rotation therewith so that the overall center of gravity of piercing tool 1, additional mass 44 and tool holder 2 is arranged in such a manner that the moment of inertia of tool holder 2, piercing tool 1 and additional mass 44, acting around the first pivot axis 12, will form at least a part of the restoring moment.

Figure 4:
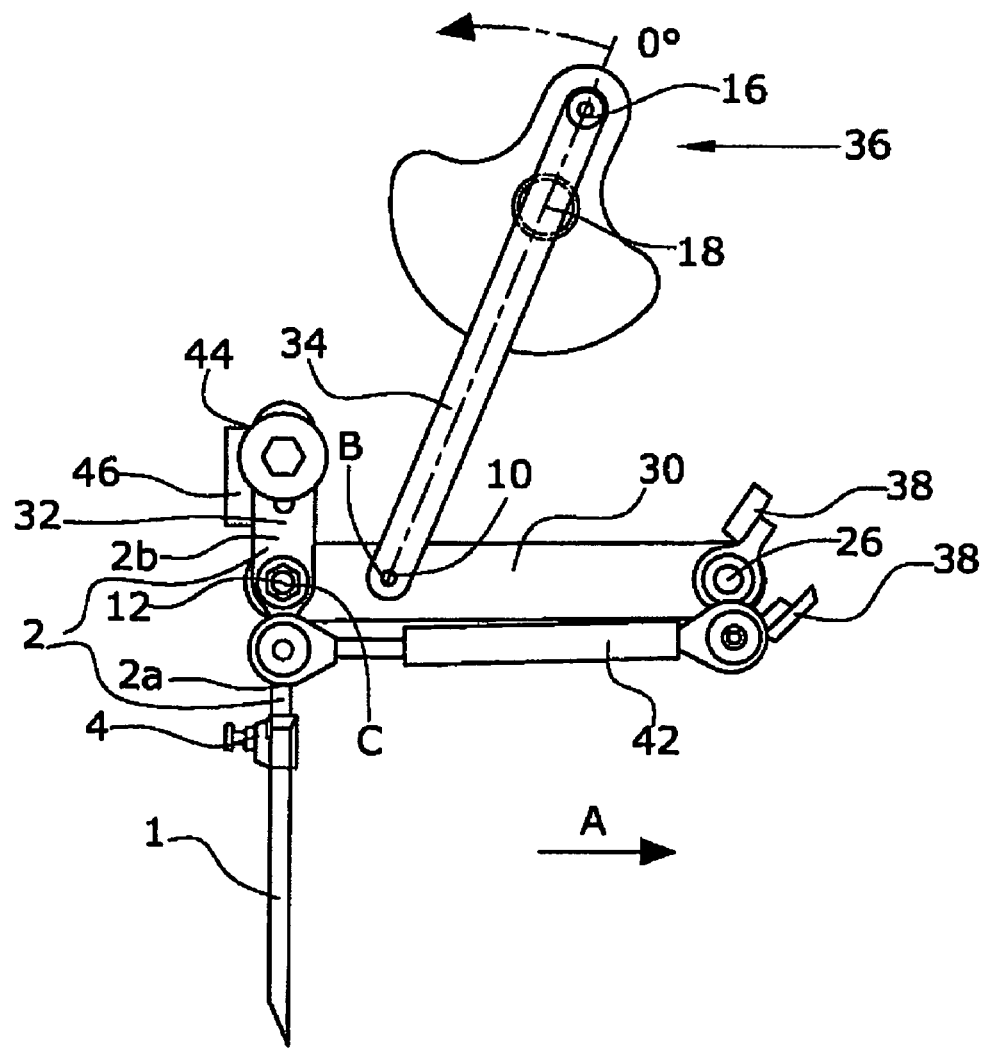
FIG. 4 is a lateral view of an exemplary embodiment of the invention with central positioning device.

FIG. 4 shows an exemplary embodiment similar to that of FIG. 2, with the difference that, instead of the coupling arm 24 with stopper 22, a spring damper element 42 is arranged parallel to the guiding element. Said spring damper element 42 is pivotably supported on the one side to machine frame 38 and on the opposite side to tool holder 2. Spring damper element 42 allows for the tool holder 2 to be pivoted around first pivot axis 12 and, upon release of the engagement with the soil, will exert at least a part of the restoring moment onto tool holder 2 so that the piercing tool 1 after withdrawal from the soil 8 will pivot back into the starting position. Arm 2b of tool holder 2 comprises a position adjustment device 46 and an additional mass 44. The distance from said additional mass 44 to the first pivot axis 12 can be adjusted, preferably centrally, with the aid of said position adjustment device 46. Position adjustment device 46 comprises a sensor which is operative to determine the position of additional mass 44. The position of additional mass 44 can be adjusted to arrange the overall center of gravity of tool holder 2, piercing tool 1 and additional mass 44 relative to first pivot axis 12 in such a manner that the moment of inertia of the tool holder 2, the additional mass 44 and the at least one piercing tool 1, counteracting the restoring moment, is at least partially reduced or compensated or overcompensated to the effect that the moment of inertia acting around the first pivot axis will form at least a part of the restoring moment.

Figure 5:
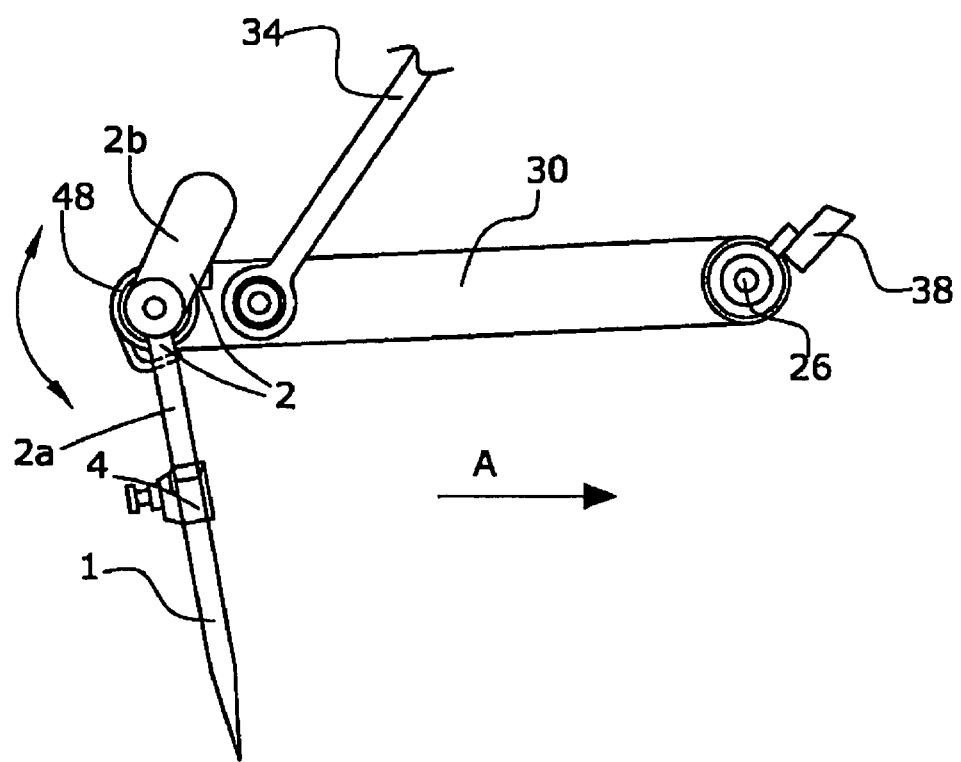
FIG. 5 is a lateral view of a further exemplary embodiment wherein a helically or spirally shaped torsion spring is used.

Illustrated in FIG. 5 is an embodiment similar to that according to FIG. 2 but differing in that, instead of spring damper element 42, use is made of a torsion element 48,50, 64. Said torsion element 48,50,64, acting coaxially to the first pivot axis 12, is arranged between tool holder 2 and guiding element 30.

Prior to piercing, torsion element 48,50,64 is unloaded wherein, in the starting position briefly before piercing, a predetermined piercing angle of piercing tool 1 has been set. When force is exerted onto piercing tool 1, i.e. in the pierced-in state of piercing tool 1 and while the soil treatment device 6 is being advanced in the travel direction A, torsion element 48,50,64 will allow for the piercing tool 1 to be pivoted oppositely to the travel direction. Upon release of the exerted force, i.e. after withdrawal of the piercing tool 1 from the soil 8, the torsion element 48,50,64 will exert at least a part of the restoring force onto the tool holder 2, causing the piercing tool 1 to pivot back into the starting position after withdrawal.

In FIG. 5, torsion element 48,50,64 is a spirally and respectively helically shaped, metallic torsion spring 48 extending coaxially to first pivot axis 12. One side of said metal spring is fastened to guiding element 30 and the other end is fastened to tool holder 2 for common rotation. It is also possible herein to use a coaxial, axle- or shell-shaped support element for reinforcement. Said support element can then also be supported for rotation on tool holder 2 and guiding element 30.

Figure 6:
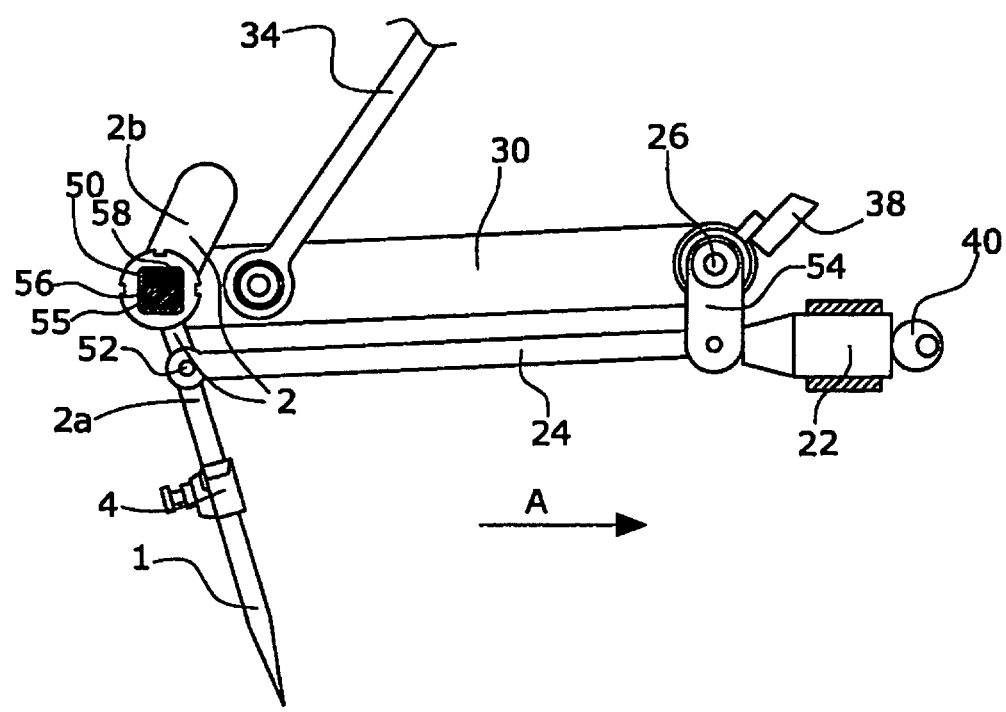
FIG. 6 is a lateral view of a further exemplary embodiment wherein an elastomer-metal compound element is used.

FIG. 6 shows a modified embodiment of FIG. 5 wherein, additionally, a coupling arm 24 is pivotably supported on tool holder 2 for central adjustment of the piercing angle. Prior to piercing into the soil 8, said coupling arm 24 is in direct contact with stopper 22. On the end remote from tool holder 2, coupling arm 24 is pivotably supported at the intermediate element 54 which itself is pivotably supported on machine frame 38. Using an adjustment device 40, in this case an eccentric rod, stopper 22 can be centrally adjusted for all piercing tools 1 and respectively groups of piercing tools 1. Stopper 22 is operative to delimit the restoring movement of the piercing tools 1 back to the starting position. Thus, the piercing angle of the piercing tools 1 can be adjusted centrally. Alternatively, the piercing angle can also be adjusted individually by attachment of the stopper 22 directly to guiding element 30 or tool holder 2.

In FIG. 6, torsion element 48,50,64 consists of a known metal-elastomer compound element 50. Said elastomer-metal compound element 50 comprises a casing 55 which preferably consists of a quadrangular and respectively triangular hollow profile. The elastomer-metal compound element further comprises a central rod 56 which is arranged internally of casing 55 and again preferably has a quadrangular and respectively triangular cross section. Alternatively, said casing 55 as well as said rod 56 can be given a generally polygonal cross section.

Said rod, e.g. in case of substantially quadratic profiles of casing 55 and rod 56, is offset relative to casing 55 by a rotational angle of 45°. Between casing 55 and rod 56, elastomeric elements 58 are arranged in the corners of casing 55 and extend substantially along the whole length of casing 55 and rod 56. Under the effect of a rotational moment, rod 56 can be rotated relative to casing 55. In the process, said elastomeric elements 58 will be compressed, and there will be generated an elastic restoring moment forming at least a part of the total restoring moment. If casing 55 and rod 56 have a triangular cross-sectional shape, a larger torsion angle can be used.

Figure 7:
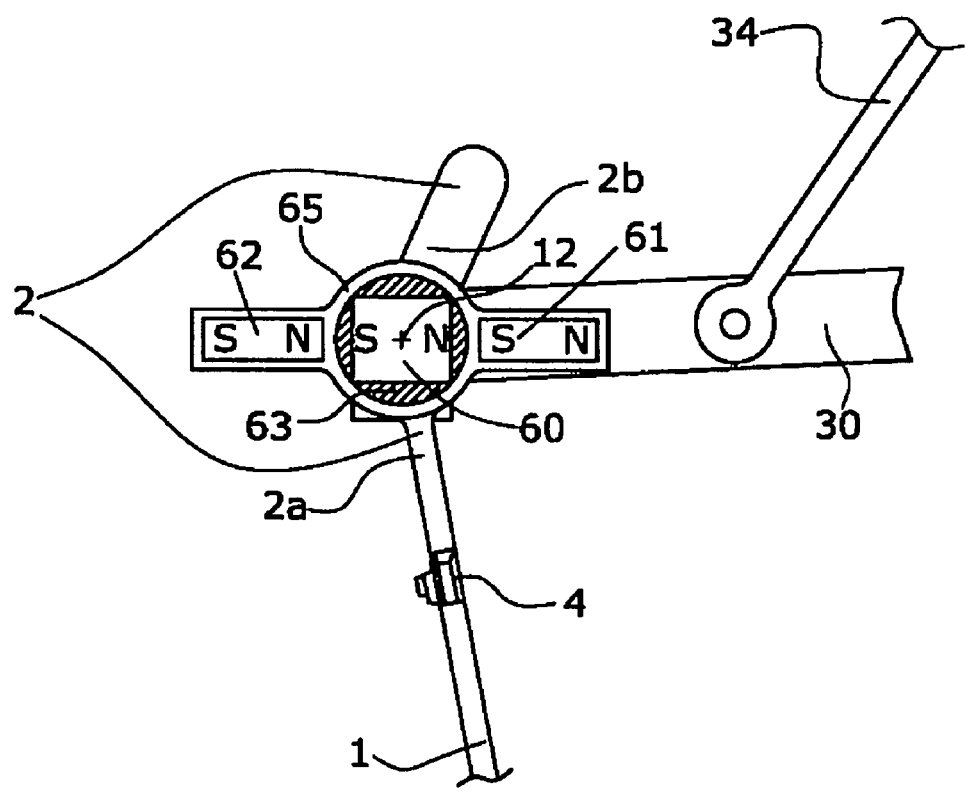
FIG. 7 is a lateral view of a further exemplary embodiment wherein the torsion element comprises three magnets.

FIG. 7 shows a further embodiment with a torsion element 48,50,64. Torsion element 48,50,64 in this case comprises three magnetic elements. The first magnetic element 60 is arranged internally of an axle-shaped holding element 63 and is fastened thereto for common rotation therewith. Said holding element 63 is fastened to guiding element 30 for common rotation therewith. Holding element 63 has a round cross section. Holding element 63 is enclosed by at least one further moveable intermediate element 65 fastened to tool holder 2 for common rotation therewith. Tool holder 2 can be pivoted around the first pivot axis 12 relative to holding element 63 serving as a pivot bearing. Within said intermediate element 65, two further magnetic elements 61,62 are arranged opposite each other.

As long as the piercing tool 1 is in its starting and rest position, the north pole of the second magnetic element 62 is arranged on the side of the south pole of the first magnetic element 60, and the south pole of the third magnetic element 61 is arranged on the side of the north pole of the first magnetic element 60.

In the situation where the piercing tool 1 is in its pierced-in state and the soil working device 6 is being moved on, tool holder 2 will be pivoted relative to holding element 63 around first pivot axis 12 against a magnetic moment. As soon as piercing tool 1 is outside the soil, said magnetic restoring moment of said magnetic elements 60,61,62 which represents at least a part of the overall restoring moment, will move the piercing tool 1 into the starting position again.

The magnetic elements 60,61,62 can consist of permanent magnets or solenoids. If a solenoid is provided, it is possible to switch on the current only during specific movement phases, e.g. while the piercing tool 1 is not in contact with the soil 1.

Holding element 63, intermediate element 65, guiding element 30 and tool holder 2, in many embodiments are made of a non-magnetizable material or a hardly magnetizable material such as e.g. non-magnetizable steel (submarine steel), high-strength metals, plastic, such as the plastic sold under the trademark Duroplast, or ceramic material.

In FIG. 7, the overall center of gravity of the tool holder 2, the intermediate element 65, the second 62 and third 61 magnetic elements and the at least one piercing tool 1 relative to the first pivot axis 12 are arranged in such a manner that the moment of inertia of the tool holder 2, the intermediate element 65, the second 62 and third 61 magnetic elements and the at least one piercing tool 1, counteracting the restoring moment, is at least partially reduced or compensated or overcompensated to the effect that the moment of inertia acting around the first pivot axis 12 will form at least a part of the restoring moment.

Figure 8:
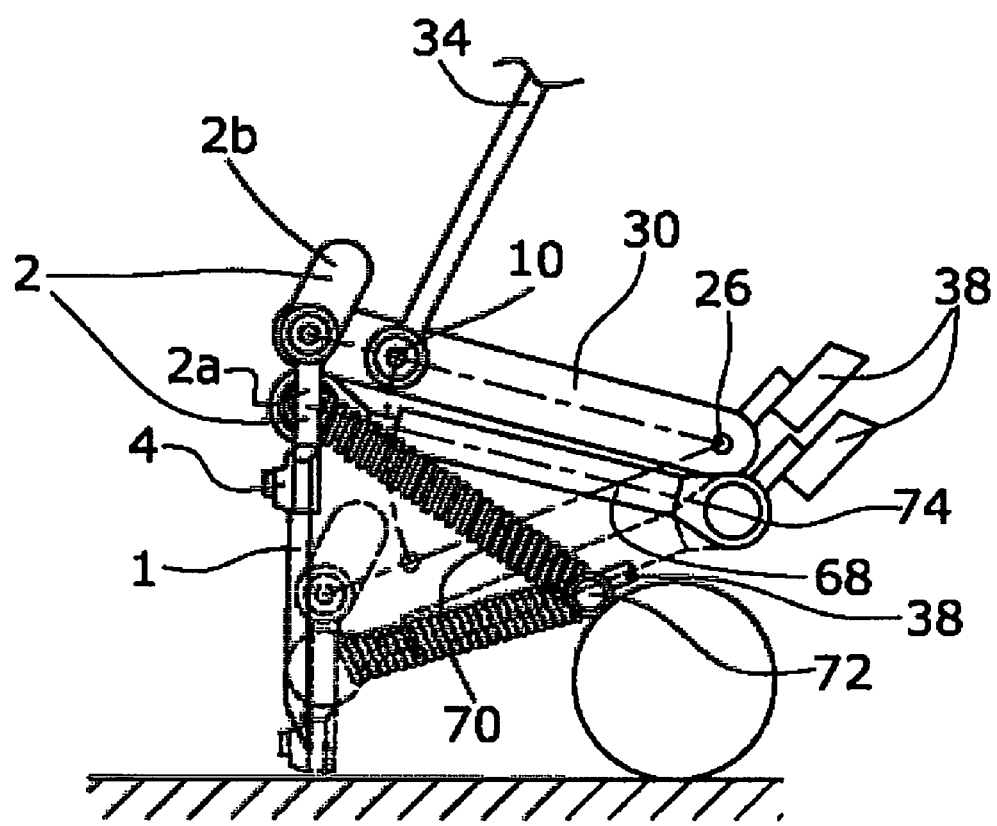
FIG. 8 is a lateral view of a further exemplary embodiment of the invention with spring damper element.

FIG. 8 shows a further exemplary embodiment wherein a damper element 68 is arranged parallel to guiding element 30. Said damper element 68 is on one side pivotably supported to tool holder 2 and on the opposite side to machine frame 38. A spring 70 is also pivotably supported to tool holder 2 and on the opposite side to machine frame 38. Said spring 70 is, however, not arranged parallel to guiding element 30. Spring 70 is arranged in such a manner that spring 70 will have the largest spring length when the at least one piercing tool 1 is located outside the soil 8, and the smallest spring length when the piercing tool 1 is located within the soil 8. This has the consequence that the spring 70 will exert a large restoring element on the at least one piercing tool 1 when the piercing tool 1 is outside the soil 8, and that the spring 70 will exert a small restoring element on the at least one piercing tool 1 when the piercing tool 1 is within the soil 8.

Figure 9:
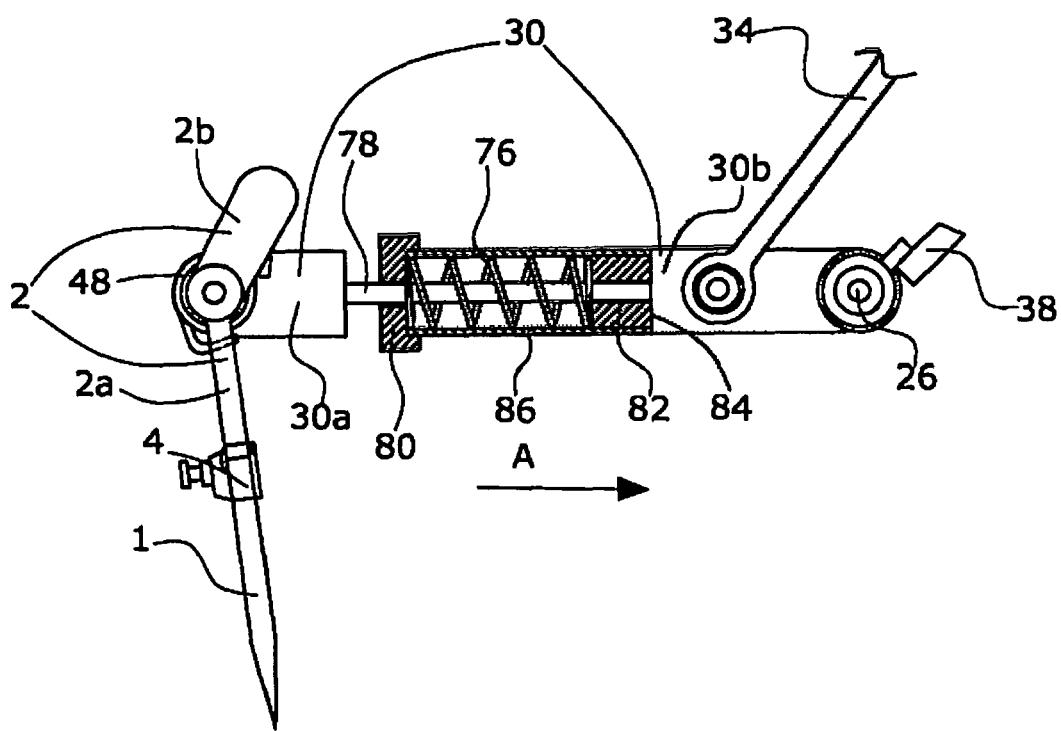
FIG. 9 shows a further embodiment with length-adjustable support arm.

FIG. 9 shows a further exemplary embodiment comprising a two-part lengthened guiding element 30. Arranged between the two parts 30a and 30b of guiding element 30 is a spring element 76 in the form of a helically or spirally shaped pressure spring. On the first part 30a of guiding element 30, the tool holder 2 is pivotably supported. The second part 30b of guiding element 30 is pivotably supported on machine frame 38. The pushing rod 34 of crank drive 36 is arranged to drive the guiding element 30 via the second part 30b of guiding element 30. Said spring element 76 is seated on a piston rod 78 connected to the first part 30a of guiding element 30. The two parts 30a,30b of guiding element 30 are of a telescopic configuration. A piston and adjustment element 82 is provided for variably biasing the spring element 76 in an adjustable manner and for guiding the first part 30a of guiding element 30 within a bore 86 of the second part 30b of guiding element 30. The shell-shaped piston and adjustment element 82 has a smooth outer surface so that it can serve as a piston element in said bore 86 of the second part 30b of guiding element 30. Prior to piercing the at least one piercing tool 1, the piston and adjustment element 82 and/or the piston rod 78 are in direct contact with the second part 30b of guiding element 30 so that, briefly before and during the piercing of piercing tool 1 into the soil 8, a direct force transmission—without spring element 76—can take place from the second part 30b of guiding element 30 onto the first part 30a of guiding element 30 and vice versa. In the situation where the piercing tool 1 is in its pierced-in state and the soil working device 6 is being moved on in the travel direction A, the at least one piercing tool 1 will be pivoted. This exemplary embodiment reduces the danger that, in case of a too fast movement of the soil working device in the travel direction A, the piercing tools 1 could cut slits into the surface of the soil.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more".

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

All publications, patent applications, issued patents, and other documents referred to in this specification are herein incorporated by reference as if each individual publication, patent application, issued patent, or other document were specifically and individually indicated to be incorporated by reference in its entirety. Definitions that are contained in text incorporated by reference are excluded to the extent that they contradict definitions in this disclosure.

What is claimed is:

1. A mobile soil working device, comprising
    a machine frame,
    a drive for at least one piercing tool which can be lifted and lowered, the piercing tool being operative to pierce the soil and to be withdrawn again,
    a guiding element, moveably guided on the machine frame, for at least one piercing tool, wherein before the piercing the piercing tool is located in a starting position at a predetermined piercing angle,
    a tool holder for the piercing tool, which holder is pivotable around a first pivot axis in the guiding element that can be lifted and lowered by said drive in order to allow for the piercing tool to be pivoted relative to the guiding element during engagement with the soil, where, at least after withdrawal of the piercing tool from the soil, a restoring moment acting around the first pivot axis is exerted onto the tool holder, so that the piercing tool pivots back again into the starting position, wherein that the overall center of gravity of the tool holder and said at least one piercing tool is arranged in relation to the first pivot axis in such a manner that the moment of inertia of the tool holder and the piercing tool that counteracts said restoring moment, is overcompensated to the effect that the moment of inertia acting around the first pivot axis forms at least part of the restoring moment.

2. The soil working device according to claim 1, wherein an additional mass is coupled to the tool holder and is preferably fastened thereto for common rotation therewith.

3. The soil working device according to claim 2, wherein the overall center of gravity of said additional mass, the tool holder and the at least one piercing tool is arranged in relation to the first pivot axis in such a manner that said moment of inertia counteracting the restoring moment is overcompensated.

4. The soil working device according to claim 3, wherein the overall center of gravity of the additional mass, the tool holder and the at least one piercing tool is arranged in relation to the first pivot axis in such a manner that said moment of inertia counteracting the restoring moment is overcompensated to the effect that the moment of inertia acting around the first pivot axis forms at least a part of the restoring moment.

5. The soil working device according to claim 1, wherein the distance, preferably the horizontal distance, of the overall center of gravity of the tool holder and the at least one piercing tool, or the distance, preferably the horizontal distance, of the overall center of gravity of the additional mass, the tool holder and the at least one piercing tool from the first pivot axis, is adjustable.

6. The soil working device according to claim 5, wherein the distance, preferably the horizontal distance, of the overall center of gravity of the tool holder and the at least one piercing tool, or the distance, preferably the horizontal distance, of the overall center of gravity of the additional mass, the tool holder and the at least one piercing tool from the first pivot axis, is adjustable centrally for all tool holders.

7. The soil working device according to claim 1, wherein the guiding element is a support arm pivotably supported in a second pivot bearing on the machine frame.

8. The soil working device according to claim 7, wherein said support arm is configured for length adjustment against a spring force.

9. The soil working device according to claim 7, wherein at least one torsion and respectively pressure spring element or a spring damper element is arranged to the side of the support arm, preferably parallel to the support arm, said torsion and respectively pressure spring element or said spring damper element allowing for a pivoting movement of the tool holder around the first pivot axis and, upon release of the engagement with the soil, exerting at least a part of the restoring moment on the tool holder so that the piercing tool after withdrawal from the soil is pivoted back into the starting position again.

10. The soil working device according to claim 9, wherein said torsion and respectively pressure spring element or said spring damper element is arranged on the machine frame in a manner causing it to exert a high restoring moment on the tool holder if the piercing tool is located outside the soil, and causing it to exert a small restoring moment on the tool holder if the piercing tool is located in the soil.

11. The soil working device according to claim 1, wherein between the tool holder and the guiding element, a torsion element is arranged which allows for pivoting movement of the tool holder relative to the guiding element and, upon release of the influence of the force, exerts at least a part of the restoring moment on the tool holder, so that the piercing tool after withdrawal from the soil will be pivoted back into the starting position again.

12. The soil working device according to claim 11, wherein said torsion element consists of at least one elastomeric element, an elastomer-metal compound element or a helically or spirally shaped, metallic torsion spring.

13. The soil working device according to claim 11, wherein said torsion element comprises at least two magnetic elements, said at least two magnetic elements being oriented relative to each other in a manner causing them to allow for pivoting movement of the tool holder around the first pivot axis and, upon release of the engagement with the soil, to exert at least a part of the restoring moment on the tool holder, so that the piercing tool after withdrawal from the soil will be pivoted back into the starting position again.

14. The soil working device according to claim 13, wherein said magnetic elements consist of permanent magnets or solenoids.

15. The soil working device according to claim 3, wherein the overall center of gravity of said additional mass, the tool holder and the at least one piercing tool is arranged in relation to the first pivot axis in such a manner that said moment of inertia counteracting the restoring moment is at least partially reduced or compensated.

16. A mobile soil working device, comprising
    a machine frame,
    a drive for at least one piercing tool which can be lifted and lowered, the piercing tool being operative to pierce the soil and to be withdrawn again,
    a guiding element, moveably guided on the machine frame, for at least one piercing tool, wherein before the piercing the piercing tool is located in a starting position at a predetermined piercing angle, a tool holder for the piercing tool, which holder is pivotable around a first pivot axis in the guiding element that can be lifted and lowered by said drive in order to allow for the piercing tool to be pivoted relative to the guiding element during engagement with the soil, where, at least after withdrawal of the piercing tool from the soil, a restoring moment acting around the first pivot axis is exerted onto the tool holder, so that the piercing tool pivots back again into the starting position, wherein the overall center of gravity of the tool holder and said at least one piercing tool is arranged in relation to the first pivot axis in such a manner that the moment of inertia of the tool holder and the piercing tool that counteracts said restoring moment, is compensated or overcompensated wherein after withdrawal of the piercing tools from the soil the overall center of gravity of the tool holder and piercing tool in relation to the first pivot axis in the horizontal direction is located on the opposite side of the at least one piercing tool.

17. A mobile soil working device, comprising
a machine frame,
a drive for at least one piercing tool which can be lifted and lowered, the piercing tool being operative to pierce the soil and to be withdrawn again,
a guiding element, moveably guided on the machine frame, for at least one piercing tool, wherein before the piercing the piercing tool is located in a starting position at a predetermined piercing angle,
a tool holder for the piercing tool, which holder is pivotable around a first pivot axis in the guiding element that can be lifted and lowered by said drive in order to allow for the piercing tool to be pivoted relative to the guiding element during engagement with the soil, where, at least after withdrawal of the piercing tool from the soil, a restoring moment acting around the first pivot axis is exerted onto the tool holder, so that the piercing tool pivots back again into the starting position, wherein the overall center of gravity of the tool holder and said at least one piercing tool is arranged in relation to the first pivot axis in such a manner that the moment of inertia of the tool holder and the piercing tool that counteracts said restoring moment is compensated wherein after withdrawal of the piercing tools from the soil the overall center of gravity of the tool holder and piercing tool in relation to the first pivot axis in the horizontal direction is located on the opposite side of the at least one piercing tool.

18. The soil working device according to claim 17, wherein an additional mass is coupled to the tool holder and is preferably fastened thereto for common rotation therewith.

19. The soil working device according to claim 17, wherein the overall center of gravity of the additional mass, the tool holder and the at least one piercing tool is situated on the first pivot axis.

* * * * *